United States Patent [19]
Ahlberg et al.

[11] Patent Number: 5,657,372
[45] Date of Patent: Aug. 12, 1997

[54] SYSTEMS AND METHODS FOR SELECTIVELY ACCEPTING TELEPHONE CALLS WITHOUT ESTABLISHING VOICE COMMUNICATIONS

[75] Inventors: Björn G. D. Ahlberg, Falsterbo, Sweden; Anders Mölne, Cary, N.C.

[73] Assignee: Ericsson Inc., Research Triangle Park, N.C.

[21] Appl. No.: 323,850

[22] Filed: Oct. 17, 1994

[51] Int. Cl.$^6$ .................................................. H04Q 7/22
[52] U.S. Cl. ........................... 455/414; 455/422; 455/567
[58] Field of Search ................................. 379/58, 59, 61, 379/63, 67, 89, 82; 455/33.1, 54.1

[56] References Cited

U.S. PATENT DOCUMENTS

| | | | |
|---|---|---|---|
| 4,608,458 | 8/1986 | Hashimoto | 179/2 A |
| 4,817,126 | 3/1989 | Hendershot . | |
| 4,881,259 | 11/1989 | Scordato | 379/58 |
| 4,903,323 | 2/1990 | Hendershot . | |
| 5,099,508 | 3/1992 | Inaba | 379/58 |
| 5,231,657 | 7/1993 | Umemoto et al. | 379/61 |
| 5,253,287 | 10/1993 | Hasegawa | 379/58 X |
| 5,315,636 | 5/1994 | Patel . | |
| 5,329,578 | 7/1994 | Brennan et al. | 379/59 X |
| 5,442,814 | 8/1995 | Seo | 379/59 X |
| 5,553,125 | 9/1996 | Martensson | 379/58 X |
| 5,570,413 | 10/1996 | Ahlberg et al. | 379/59 |
| 5,574,774 | 11/1996 | Ahlberg et al. | 379/59 |

FOREIGN PATENT DOCUMENTS

| | | |
|---|---|---|
| 0435775 A2 | 7/1991 | European Pat. Off. . |
| 0613314 A2 | 8/1994 | European Pat. Off. . |
| 33 33587 A1 | 4/1985 | Germany . |
| 2-65536 | 3/1990 | Japan . |
| WO90/03068 | 3/1990 | WIPO . |
| WO90/06039 | 5/1990 | WIPO . |

OTHER PUBLICATIONS

PCT International Search Report dated Mar. 18, 1996 for PCT/US95/12913.

*Primary Examiner*—Dwayne Bost
*Assistant Examiner*—William G. Trost
*Attorney, Agent, or Firm*—Bell, Seltzer, Park & Gibson

[57] ABSTRACT

A cellular radio communications system and method including an answering delay for accepting a telephone call from a source telephone without establishing voice communications between the cellular telephone and the source telephone. The answering delay is actuated by selection of a hold selection by the user of the cellular telephone after the user has been alerted of an impending telephone call. Thereafter, voice communications can be established between the cellular telephone and the source telephone of the accepted telephone call by actuation of a release hold selection by the user of the cellular telephone. Accordingly, a user can accept an incoming telephone call without conversing with the calling party such that the user can complete their prior activities prior to establishing voice communications with the source telephone. Thus, the convenience and safety of accepting incoming cellular telephone calls is further enhanced.

20 Claims, 3 Drawing Sheets

SYSTEMS AND METHODS FOR SELECTIVELY ACCEPTING TELEPHONE CALLS WITHOUT ESTABLISHING VOICE COMMUNICATIONS

FIELD OF THE INVENTION

The present invention relates generally to cellular radio communications systems and methods and, more particularly, to systems and methods for selectively establishing voice communications in a cellular radio communications system.

BACKGROUND OF THE INVENTION

Cellular radio communications systems are increasingly employed to provide wireless voice and data communications to a number of mobile units or subscribers. Cellular radio communications systems include both analog cellular systems, such as the "AMPS" system, and, more recently, digital cellular systems, such as the pan-European "GSM" system. These systems, and others, are described in a book entitled *Dual Mode Cellular* by Harte, published by P. T. Steiner Publishing Co., Bridgeville, Pa. (1992).

A cellular radio communications system generally includes one or more cellular telephones, one or more radio base stations and a Mobile Telephone Switching Center (MSC). A typical cellular radio communications system can include hundreds of radio base stations, thousands of cellular telephones and one or more MSC's. A cellular radio communications system includes a number of spaced apart radio zones referred to as cells. Each cell includes a radio base station for transmitting and receiving messages to and from cellular telephones which are located within the cell range.

Each cell of the cellular radio communications system typically includes a plurality of duplex voice channels over which cellular telephone messages are carried. Each cell is also provided with a number of control channels to control the operation of the cellular telephones and the assigned voice channels. Accordingly, through the cellular radio communications system, a duplex radio communication signal or link can be established between two cellular telephones or, between the cellular telephone and the wire line telephone.

As used herein, the term "cellular telephone" encompasses a wide variety of portable telephone devices which access a cellular radio communications system. Cellular telephones include mobile telephones that are hand held or of a bag phone variety and permanently mounted car cellular telephones. The term "cellular telephone" also include terminals which provide functions in addition to those of a cellular telephone, such as facsimile, data communications, data processing, word processing applications and other personal communication systems functions. These highly functional cellular telephones are often referred to as "Personal Communication Systems."

Each radio base station generally includes a control unit and an associated antenna. With respect to the cellular telephones located within the cell range, the base station functions chiefly to relay messages to and from the cellular telephones. The radio base station also supervises the quality of the communications link with the cellular telephones. A typical radio base station is Model No. RBS882 manufactured by Ericsson Radio Systems AB, Stockholm, Sweden for the CMS8800 cellular mobile telephone system. A full description of this analog cellular network is provided in Publication No. EN/LZT 101 908 R2B, published by Ericsson Radio Systems AB.

A number of base stations are connected to a single MSC which acts as the central coordinating element of the cellular system. The MSC includes a cellular processor and a cellular switch connected to the Public Switched Telephone Network (PSTN) to allow communications between the cellular telephones and wire line telephones. The MSC can also be associated with a Home Location Register (HLR). The HLR includes storage means for storing data relating to the subscribers of the cellular system. This data can include the telephone number of the subscriber as well as any specific services requested by the subscriber, such as call waiting or call hold. The HLR can also include processing means for manipulating the stored subscriber data.

A feature node can also be associated with the MSC of a cellular radio communications system or with another associated communications network, such as the PSTN. For example, the feature node can be incorporated within or associated with the HLR. Even if the feature node is associated with another communications network, such as the PSTN, the cellular radio communications network can access the feature node via the interconnection between the MSC of the cellular radio communications system and the PSTN or other communications network.

A feature node provides predetermined functions to the cellular telephones or the telephones associated with the PSTN, such as, for example, establishing an efficient communications link between telephones, such as via intermediate radio base stations, or providing voice-controlled speech information and number translation services as well as facilitating the establishment of conference telephone calls. Still further, a feature node can provide paging services for the user of a cellular telephone and can facilitate the establishment of alternative communications links if the primary communications link is unavailable. A feature node is described, for example, in more detail in U.S. patent application Ser. No. 018,268 entitled "A Method Of Establishing Cooperation With A Functionality" and U.S. patent application Ser. No. 018,223 entitled "A Method Of Organizing Communication", both of which were filed on Feb. 16, 1993 and both of which are incorporated herein by reference.

Due in part to the mobility of cellular telephones, numerous users of a cellular radio communications system carry a cellular telephone with them while they are conducting other activities. For example, many users have hand held cellular telephones which they carry with them throughout the day. Other users have mobile telephones that can be of either a bag phone variety or a permanently mounted car cellular telephone which permit the subscriber to communicate while in a vehicle. Accordingly, the cellular telephone user can be reached while they are performing a great variety of activities simply by placing a telephone call to the user's cellular telephone.

In response to the alert of the cellular telephone, the user, if they are in the vicinity of the cellular telephone, can answer the telephone call and begin voice communications with the calling party. Alternatively, if the user does not desire to presently respond to the alert and begin voice communications with the calling party, the user can simply ignore or not respond to the alert. Still further, the user can redirect the incoming telephone call by transferring the telephone call to another party or to a answering device to which the cellular telephone has previously been assigned.

In some instances, the user of the cellular telephone desires to converse with the calling party, but is unable to interrupt their present activities and begin communications with the calling party. For example, the user may be involved in a meeting which is near completion or the user may be involved in a driving activity which demands their full attention, such as passing a large truck on a narrow road. In these instances, the user can establish voice communications with the calling party and inform them that they will be with them in a moment. The user can then place the telephone call on hold, thus closing the speaker and the microphone of the cellular telephone, and complete their present activities. Once completed, the user can resume communications with the calling party.

However, the user can sometimes be involved in particularly demanding activities and is unable to conveniently or safely respond, even momentarily, to the incoming telephone call. In these instances, the user may desire to converse with the calling party, but must ignore the alert of the cellular telephone to complete their present activities. Thus, the user must either return the telephone call at a later time if the calling party left a message or must wait for the calling party to again attempt to contact the user. In either case, communications between the cellular telephone and the source telephone are, at best, significantly delayed.

SUMMARY OF THE INVENTION

In view of the foregoing background, it is therefore a object of the present invention to provide improved cellular radio communications systems and methods.

It is also an object of the present invention to provide cellular radio communications systems and methods which selectively establish voice communications between a cellular telephone and a source telephone.

These and other objects are provided, according to the present invention, by cellular radio communications systems and methods which permit a user of a cellular telephone to accept a telephone call from a source telephone placing a telephone call to the cellular telephone while delaying the establishment of voice communications with the source telephone until the user provides a predetermined signal. Thus, the user can accept the telephone call without hindering their current activities and can delay establishment of voice communications with the calling party until they have completed those activities.

A cellular radio communications system according to the present invention includes notification means for alerting a user of a cellular telephone that a source telephone has placed a telephone call to the cellular telephone. The cellular radio communications system also includes answering delay means, responsive to the notification means and further responsive to the actuation of a hold selection means by the user of the cellular telephone, for accepting the telephone call from the source telephone without establishing voice communications between the cellular telephone and a source telephone. Thus, the user can accept the incoming telephone call without ever conversing with the calling party such that the user can continue their present activities.

The answering delay means also preferably transmits a predetermined signal, such as a predetermined message announcing the acceptance of the telephone call, to the source telephone. The answering delay means of one embodiment also includes timer means such that the answering delay means is only responsive to the actuation of the hold selection means within a predetermined period of time after the notification means has alerted the user.

A cellular radio communications system of the present invention also includes releasing means, responsive to the actuation of a release hold selection means by the user of the cellular telephone after acceptance of the telephone call from the source telephone by the answering delay means, for establishing voice communications between the cellular telephone and the source telephone. The user thus typically activates the release hold selection means upon the completion of their prior activity.

Further, the cellular radio communications system includes answering means, responsive to the actuation of an answer selection means by the user of the cellular telephone after the notification means has alerted the user, for establishing voice communications between the cellular telephone and the source telephone. Thus, the user of the cellular telephone can establish voice communications with the source telephone without delay such as in instances in which the user is not currently involved in a demanding activity.

The cellular radio communications system also preferably includes a cellular telephone including the hold selection means, the release hold selection means, the answer selection means and, in some embodiments, the notification means for alerting the user of an impending telephone call. The cellular telephone can also include means for displaying a predetermined telephone number assigned to the source telephone such that the user of the cellular telephone can identify the user of the source telephone before responding to the alert of the notification means.

Still further, the cellular telephone preferably includes a speaker and a microphone. Accordingly, the answering delay means preferably includes means for establishing a communications link between the source telephone and the cellular telephone without opening the speaker and the microphone of the cellular telephone such that voice communications are prevented therebetween. Further, both the answering means and the releasing means of this embodiment also preferably include means for opening the speaker and the microphone such that voice communications are established between the source telephone and the cellular telephone.

A cellular radio communications system of the present invention can also include a cellular radio network which includes the cellular telephone and is associated with the answering delay means, the answering means and the releasing means. The cellular radio communications system can also include a feature node, responsive to the cellular radio network, for providing predetermined functions to the cellular telephones of the cellular radio network. In one embodiment, the feature node includes the notification means, answering delay means, the answering means and the releasing means. In another embodiment, the cellular telephone includes the notification means, answering delay means, the answering means, and releasing means. In this embodiment, the feature node preferably includes means for providing the predetermined telephone number of the source telephone to the cellular telephone for display.

Thus, the cellular radio communications system and method of the present invention allows a user of a cellular telephone to accept a telephone call from a source telephone without establishing voice communications between the cellular telephone and the source telephone. Accordingly, the user can complete their current activities prior to conversing with the user of the source telephone. Thus, the convenience and safety of using a cellular telephone of the present invention is enhanced.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
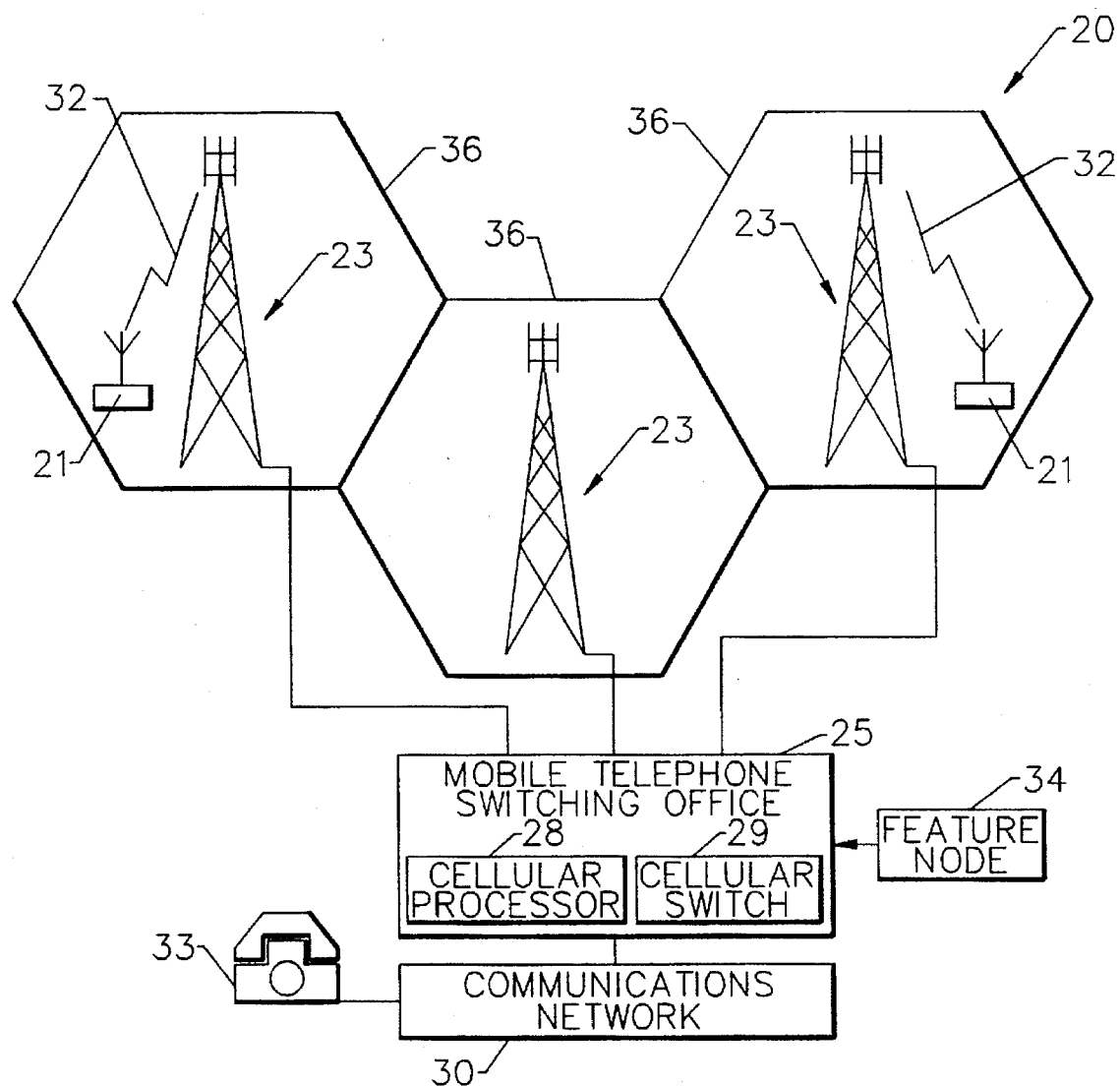
FIG. 1 is a block diagram illustrating the basic components of a cellular radio communications system of the present invention.

Referring now to FIG. 1, a cellular radio communications system 20 is illustrated. The cellular radio communications system includes a plurality of regions or cells 36, each of which is defined by a corresponding radio base station 23. Each radio base station of the cellular radio communications system is connected to a Mobile Telephone Switching Center (MSC) 25 for providing control and other known cellular radio communications system functions. As shown, the MSC typically includes a cellular processor 28 and a cellular switch 29. The cellular switch of the MSC is connected to and provides the interface to other associated communications networks, such as the Public Switched Telephone Network (PSTN) 30. The radio base stations and the MSC generally define the cellular radio network. The design of cellular radio communications systems is well known to those having skill in the art and will therefore not be described further herein. It is noted, however, that the present invention can be used with any cellular system, either analog or digital.

A cellular telephone 21 is also schematically illustrated in FIG. 1. It will be understood that each radio base station 23 is adapted to communicate with the cellular telephones in its cell 36. The other communications networks 30 to which the MSC 25 is connected, such as the PSTN, are also in communication with one or more telephones, such as the wire line telephone 33 illustrated in FIG. 1. Thus, a duplex radio communication signal 32 can be affected through the cellular radio communications system 20 between two cellular telephones, or between a cellular telephone and a wire line telephone.

One embodiment of the cellular radio communications system 20 includes a feature node 34, responsive to the cellular radio network, and associated with the MSC 25. Although not illustrated, the feature node can also be associated with the PSTN or other communications network 30 to provide predetermined functions to both the telephones 33 associated with the PSTN and the cellular telephones 21 associated with the cellular radio communications network via the interface established between the MSC and the associated PSTN. Still further, the feature node can be associated with only predetermined users of a cellular radio communications network, such as the plurality of telephones of a business.

Although the feature node 34 is illustrated as a discrete block in FIG. 1, all or a portion of the feature node 34 can actually be incorporated within the MSC 25 or the Home Location Register (HLR). In addition, while the feature node is shown as a single block in FIG. 1 for purposes of illustration, the feature node can be distributed within the cellular radio communications system 20 without departing from the spirit and scope of the invention. For example, a portion of the feature node can be incorporated within the HLR while the remainder of the feature node can be external to, but associated with, the MSC. Thus, the feature node 34 may not require a dedicated controller, memory and modem (in analog applications), but can instead, share such resources, such as a modem pool, with other components of the cellular radio communications system.

Figure 2:
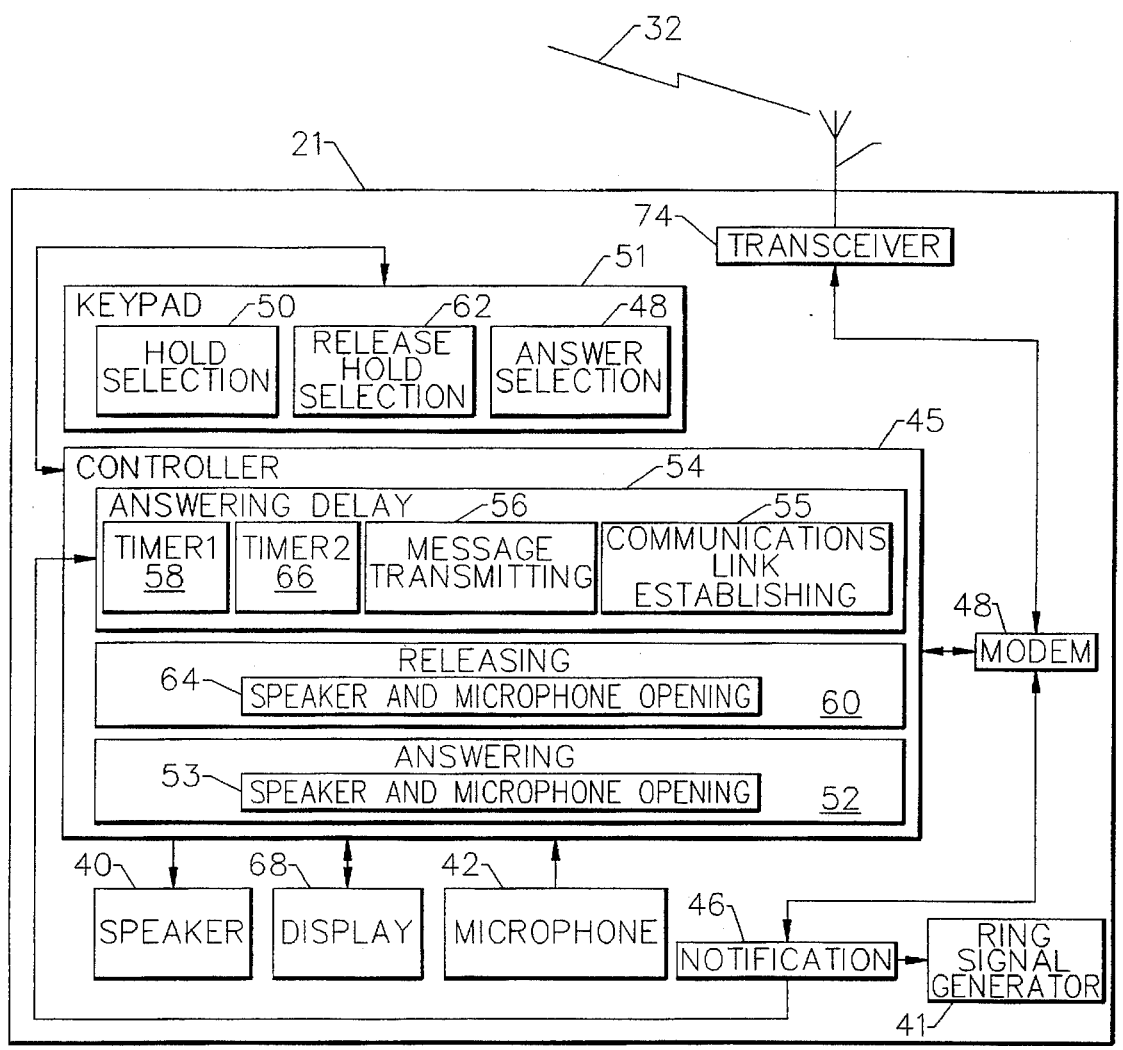
FIG. 2 is a schematic block diagram of a cellular telephone of the present invention.
Figure 3:
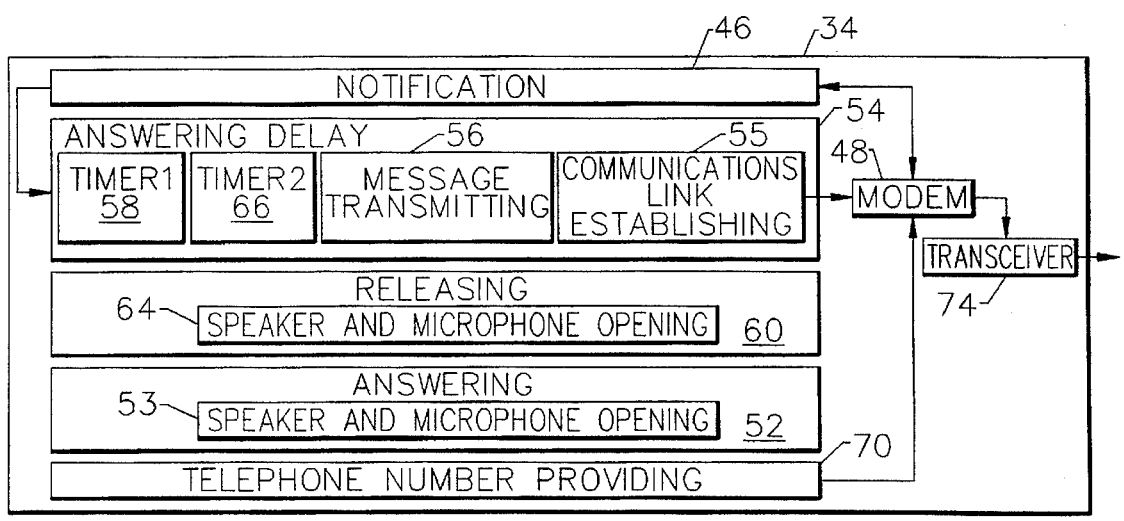
FIG. 3 is schematic block diagram of a feature node of the present invention.

Although the system and method of the present invention is described in detail below as embodied in the cellular telephone 21 of FIG. 2, a feature node 34 can also include the system and method of the present invention as shown in FIG. 3 and described below. Alternatively, the cellular radio communications system 20 can include the features of the system and method of the present invention in components other than the cellular telephone and the feature node. For example, the system and method of the present invention can be implemented, at least in part, by the MSC 25.

The cellular telephone 21 of the present invention can be adapted to communicate with either an analog or a digital cellular system. Thus, although an analog cellular telephone is shown schematically in FIG. 2, a digital cellular telephone can also be employed as described hereinbelow. In either embodiment, however, the cellular telephone 21 includes a controller 45, such as a microprocessor or a microcontroller, for controlling the operations of the cellular telephone. The cellular telephone also includes a speaker 40 and a microphone 42, operably connected to the controller, for transmitting and receiving audible signals, respectively, and for supporting voice communications between a cellular telephone and another telephone.

According to the illustrated embodiment, the cellular telephone 21 preferably includes notification means 46, operably connected to a ring signal generator 41 of the cellular telephone, for alerting the user of the cellular telephone that a telephone call has been placed thereto. While the ring signal generator can be incorporated within the speaker 40, the ring signal generator is generally a distinct component of the cellular telephone. Typically, the ring signal generator transmits an audible tone indicative of an impending telephone call in response to a predetermined signal from the notification means. Thereafter, the user of the cellular telephone can answer the call and establish voice communications with the user of the source telephone by actuating the answer selection means 48. Alternatively, the user of the cellular telephone can accept the telephone call without establishing voice communications with the source telephone by activating the hold selection means 50.

The answer selection means 48 and the hold selection means 50 can include predetermined keys on a keypad 51 associated with the cellular telephone 21. For example, the predetermined keys can be appropriately labeled, such as "answer" and "hold call", to allow ready reference by the user. The answer selection means and the hold selection means can also be combined in a single key. In addition, the answer selection means and the hold selection means can include one or more softkeys associated with a menu alternative in which the particular function selected by depressing the softkeys is defined by the cellular telephone and displayed for the user. Alternatively, the answer selection means and the hold selection means can include a touch pad for accepting user input. Further, the answer selection means and the hold selection means can be voice-activated for responding to oral commands of the user.

As schematically illustrated in FIG. 2, the controller 45 of the cellular telephone 21 includes answering means 52, responsive to activation of the answer selection means 48 by the user of the cellular telephone, for establishing voice communications between the cellular telephone and the source telephone which has requested communications with the cellular telephone. More specifically, the answering means can include means 53 for opening the speaker 40 and the microphone 42 of the cellular telephone such that voice communications are established between the source telephone and the cellular telephone without significant delay.

Once voice communications have been established, such as via a voice channel, the controller 45 operates to control an antenna 41 and an associated radio frequency (RF) transceiver 74 that receive voice signals from the source telephone in analog cellular radio systems. As known to those skilled in the art, a digital cellular telephone 21 of the present invention can also support voice communications by controlling a speech coder to code voice signals transmitted by the digital cellular telephone via an established voice channel and to decode encrypted voice signals received via the voice channel, such as from the source telephone.

In addition to voice communications, an analog cellular telephone can also transmit and receive modulated data via the open voice channel according to modem signalling, such as via a Fast Frequency Shift Keying (FFSK) signalling scheme, or tone signalling, such as via Dual Tone Multi Frequency (DTMF) tone signalling. As known to those skilled in the art, the modem 48 typically processes, i.e., modulates and demodulates, the data according to a predetermined format and rate.

Likewise, a digital cellular telephone 21 can also receive and transmit data in addition to voice communications. As known to those skilled in the art, the digitized data is typically transmitted and received via the digital control channel (DCC) according to digital signaling, such as unstructured service signaling data in the GSM system. Thus, for digital cellular telephones of a cellular radio communications system which includes a feature node 34, the digital cellular telephone need not include a modem. However, for digital cellular telephones of a cellular radio communications system which does not include a feature node, the digital cellular telephone is preferably associated with a modem pool of the cellular radio communications system which receives the digital data from the digital cellular telephone and converts the data to analog modem signaling for transmission and processing as described above.

In some instances, the user of the cellular telephone 21 would like to accept the incoming telephone call, but does not wish to immediately converse with the calling party. For example, the user of the cellular telephone may be driving a vehicle and performing a particular driving activity which requires their complete attention, such as passing a large truck on a narrow road. Thus, the user of the cellular telephone would prefer to complete their present driving activity, such as passing the truck, before commencing voice communications with the calling party. Alternatively, the user may be in a meeting which is near completion. Thus, the user of the cellular telephone typically prefers to complete the meeting and then begin conversing with the calling party.

In order to allow the user of the cellular telephone 21 to complete their prior activity without simply ignoring the impending telephone call, the cellular telephone of the present invention includes answering delay means 54, responsive to the notification means 46 and further responsive to the actuation of the hold selection means 50 by the user of the cellular telephone, for accepting a telephone call from the source telephone without establishing voice communications between the cellular telephone and the source telephone. As illustrated in FIG. 2, the answering delay means preferably includes means 55 for establishing a communication link with the source telephone without establishing voice communications therewith. The communications link establishing means also preferably transmits an "off-hook" signal to the cellular radio communications system 20 such that the cellular radio communications system can monitor the status of the cellular telephone.

The answering delay means also preferably includes means 56, such as a voice chip, for transmitting a predetermined signal to the source telephone. For example, the predetermined signal can include a message indicating that the user of the source telephone has accepted the telephone call and will begin conversing with the calling party momentarily.

The answering delay means can also include first timer means 58, such as the internal clock or timer of the controller 45, which is initiated upon notification of the cellular telephone 21 of the impending telephone call. While the first timer is included within the answering delay means 54 of the cellular telephone 21, the first timer can be a separate component of one cellular telephone without departing from the spirit and scope of the present invention.

The first timer 58 is initially set to a predetermined value within which the user of the cellular telephone 21 must respond to the alert. The predetermined time period can be set, such as by the user of the cellular telephone or the designer of the cellular radio network, to any desired value. However, the predetermined time period is preferably between about fifteen seconds and about forty seconds. Once set, the first timer is thereafter decremented such that if the user of the cellular telephone does not appropriately respond to the alert within the predetermined time period, a message is transmitted to the source telephone advising the calling party that the user of the cellular telephone is temporarily unavailable.

In this instance, voice communications are never established between the cellular telephone 21 and the source telephone and, accordingly, the speaker 40 and the microphone 42 of this cellular telephone are not opened. Instead, the telephone call placed by the calling party can be transferred to answering device, such as a voice chip of the cellular telephone which records a message from the calling party or a voice mail system of the cellular radio communications systems which, for example, may be incorporated within or associated with a feature node 34. Alternatively, the telephone call placed by the calling party can be transferred to another predetermined telephone of the cellular radio communications system 20, such as the secretary of the user of the cellular telephone.

The cellular telephone 21 of the present invention also includes releasing means 60 for establishing voice communications between the cellular telephone and the source telephone after the telephone call has been accepted by the answering delay means 54. The releasing means is preferably responsive to the activation of a release hold selection means 62, such as a predetermined key on the keypad 51 of the cellular telephone, "release hold", for example. The release hold selection means can also include one or more softkeys in association with displayed menu alternatives, can include a touch pad or can be voice-activated as described above. The releasing means also preferably includes means 64 for opening the speaker 40 and the microphone 42 of the cellular telephone such that upon actuation of the release hold selection means by the user of the cellular telephone, the speaker and the microphone are opened and voice communications are established between the cellular telephone and the source telephone.

Thus, once the user of the cellular telephone 21 has completed their prior activities, the user can actuate the release hold selection means 62 and establish voice communications with the source telephone of the previously accepted telephone call. Accordingly, the user of the cellular telephone does not have to return the call of the calling party or wait for the calling party to call again, but can conveniently and safely respond to the request for communications in a relatively quick manner.

Once the telephone call placed by the source telephone has been accepted by the answering delay means 54 of the cellular telephone 21, a second timer means 66 of the answering delay means is preferably set to a second predetermined value. As described above in conjunction with the first timer means 58, the second timer means can also be the internal clock or timer of the controller 45 or can be a separate component of the cellular telephone without departing from the spirit and scope of the present invention.

The second timer 66 is initially set to a predetermined value within which the user of the cellular telephone 21 must begin voice communications with the source telephone of the accepted telephone call. The predetermined time period can also be set, such as by the user of the cellular telephone or the designer of the cellular radio network, to any desired value. However, the predetermined time period of the second timer is preferably between about fifteen seconds and about forty seconds. Once set, the second timer is thereafter periodically decremented and, if the second timer expires prior to actuation of the release hold selection means 62 by the user of the cellular telephone, one embodiment of the cellular telephone of the present invention can transmit a predetermined message to the source telephone informing the calling party that the user of the cellular telephone is presently unable to speak with them. Alternatively, the cellular telephone can, in some instances, connect the calling party with an answering machine or other voice mail system such that the calling party can leave a message for the user of the cellular telephone. By employing a second timer means, the cellular telephone thereby ensures that the calling party is not placed on hold indefinitely.

The cellular telephone 21 preferably includes means for reminding the user that a telephone call has been placed on hold. The means for reminding the user typically includes the ring signal generator 41 which alerts the user at one or more predetermined intervals within the predetermined time period of the second timer 66 of the holding telephone call. In one embodiment, the frequency of the alerting signal provided by the ring signal generator increases as the length of time for which the telephone call has been on hold, as measured by the second timer, increases.

The cellular telephone 21 also preferably includes display means 68, typically an alphanumeric display. In one embodiment, the telephone number or other identifying indicia of the source telephone can be displayed for the user of the cellular telephone upon the alert of the telephone by the notification means 46. Thus, the user of the cellular telephone can decide, based in part upon the displayed indicia, if they wish to immediately answer the request for communications by activating the answer selection means 48 and establishing voice communications with the calling party or, if they wish to accept the telephone call, but delay establishing voice communications therewith by activating the hold selection means 50. Alternatively, the user of the cellular telephone can transfer to another party or an answering machine, or can simply ignore the request for communications.

As described hereinabove, the feature node 34 provides predetermined functions to the plurality of cellular telephones 21 of the cellular radio communications system 20. According to one embodiment of the present invention, the feature node can include the notification means 46, the answering delay means 54, the releasing means 60, and the answering means 56 as illustrated in FIG. 3. According to this embodiment, the cellular telephone is responsive to the feature node and includes the answer selection means 48, the hold selection means 50, the release hold selection means 62, a speaker 40, a microphone 42 and, in some embodiments, a display 68.

According to this embodiment of the present invention, the user of the cellular telephone 21 is typically notified by an alert produced by the ring signal generator 41 of the cellular telephone in response to a signal from the notification means 46 of the feature node 34 of a pending request for communications by a source telephone. Thereafter, the user of the cellular telephone can activate the answering selection means 48 or the hold selection means 50 as described above to respond to the alert. According to this embodiment, the feature node also preferably includes means 70 for providing the telephone number or other identifying indicia of the source telephone to the cellular telephone 21 for display by the display means 68 of the cellular telephone.

According to yet another embodiment, the cellular radio communications system 20 can include the notification means 46, the answering delay means 54, the releasing means 60, and the answering means 56. Thus, the cellular radio communications system of this embodiment can implement the system and method of the present invention in components other than the cellular telephone 21 and a feature node 34. For example, the features of the system and method of the present invention can be implemented, at least in part, by the HLR. Alternatively, the features of the system and method of the present invention can be implemented, at least in part, by the MSC 25. According to these embodiments, the cellular telephone is responsive to the cellular radio network and again includes the answer selection means 48, the hold selection means 50, the release hold selection means 62, a speaker 40, a microphone 42 and, in some embodiments, a display 68.

According to these embodiments of the present invention, the user of the cellular telephone 21 is typically notified by an alert produced by the ring signal generator 41 of the cellular telephone in response to a signal from the notification means 46 of the cellular radio communications system 20 of a pending request for communications by a source telephone. Thereafter, the user of the cellular telephone can activate the answering selection means 48 or the hold selection means 50 as described above to respond to the alert. According to this embodiment, the cellular radio communications system also preferably includes means 70 for providing the telephone number or other identifying indicia of the source telephone to the cellular telephone 21 for display by the display means 68 of the cellular telephone.

Regardless of the particular embodiment of the present invention, the source telephone can, for example, be either another cellular telephone 21 or a wire line telephone 33. In addition, the request for communications is typically a telephone call placed by the calling party from the source telephone. However, the request for communications can also be a request to transmit data, such as a message transmitted to a paging device, a facsimile transmission, an electronic mail message or other types of communications.

Each cellular telephone 21 of a cellular radio communications system 20 need not include or be associated with the answering delay feature since users of cellular telephones which include or are associated with such a feature generally pay an additional fee for the feature. Instead, the cellular radio communications system can be configured such that only predetermined ones of the cellular telephones include or utilize the answering delay feature. Thus, only those users who desire to selectively accept incoming telephone calls without beginning voice communications can select to utilize, and therefore pay for, the feature.

In addition, the user of a cellular telephone 21 who has selected the answering delay feature can subsequently remove this feature if, for example, the user is not frequently utilizing the feature. Alternatively, the user of a cellular telephone who has not initially selected the answering delay feature can subsequently select or add the feature as desired.

The system and method of the present invention, including the notification means, answering means, answering delay means and releasing means, can be embodied by the cellular radio communications system 20, external to the cellular telephone 21 and the feature node 34, if any. For example, the MSC 25 or the HLR of the cellular radio communications system can include the notification means, answering means, answering delay means and releasing means without departing from the spirit and scope of the present invention.

Figure 4:
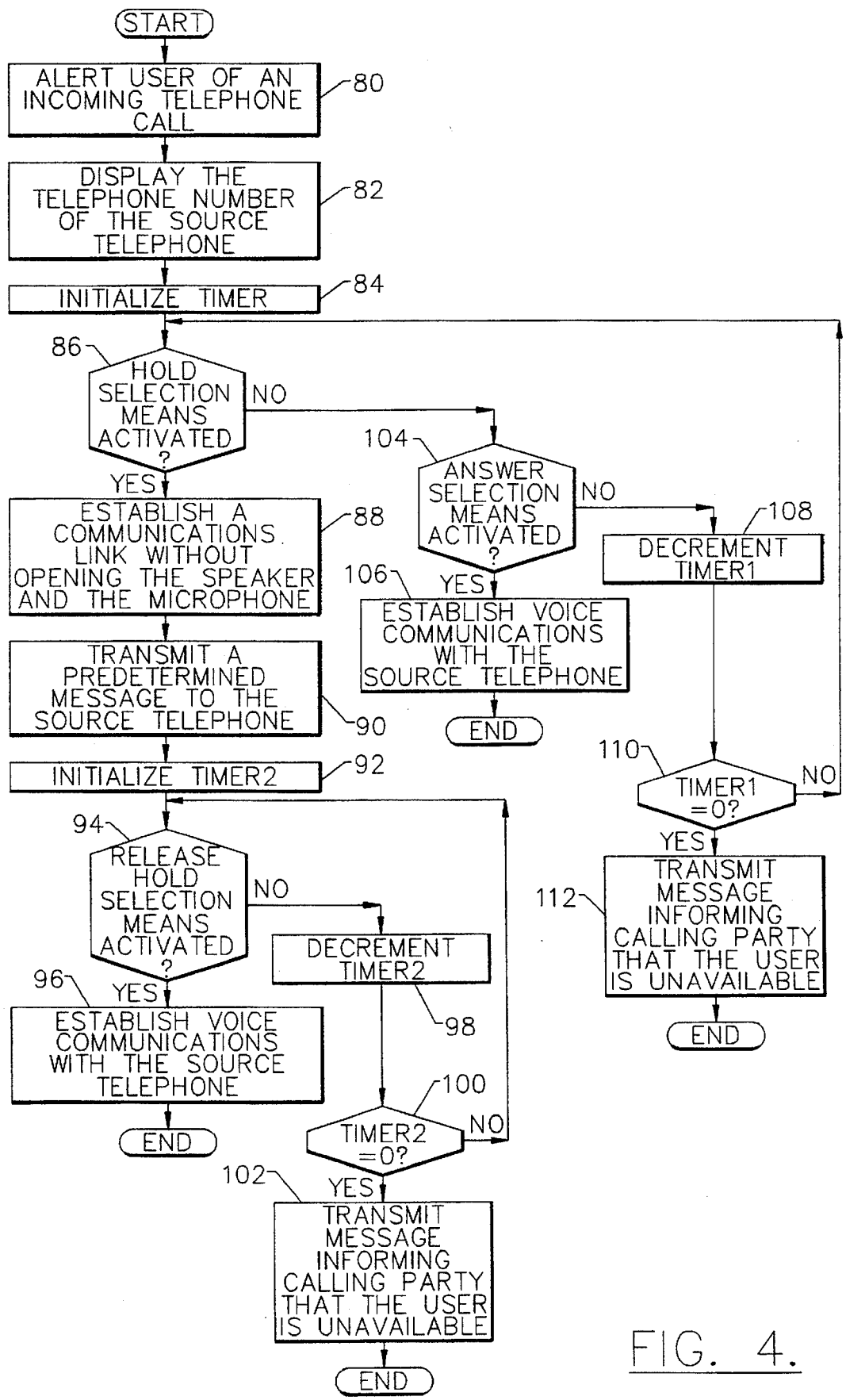
FIG. 4 illustrates detailed operations for selectively establishing voice communications with a source telephone according to the present invention.

Referring now to FIG. 4, detailed operations for selectively establishing voice communications between a cellular telephone 21 and a source telephone according to the present invention are described. As illustrated in block 80, the user of the cellular telephone is initiate alerted of the incoming telephone call placed by the source telephone. In some embodiments, the telephone number or other identifying indicia of the source telephone can be displayed, such as by the display means 68 of the cellular telephone, for the user of the cellular telephone as shown in block 82.

Thereafter, a first timer 58 can be initialized and the cellular telephone 21 monitored to determine if the user has actuated the hold selection means 50 as illustrated in blocks 84 and 86, respectively. If the user of the cellular telephone has actuated the hold selection means, a communications link is established between the cellular telephone and the source telephone by the answering delay means, without opening the speaker 40 and the microphone 42 of the cellular telephone, as shown in block 88. In addition, a predetermined message is preferably transmitted to the source telephone as illustrated in block 90 indicating that the telephone call has been accepted and that the user of the cellular telephone will be available momentarily.

A second timer 66 can thereafter be initialized and the cellular telephone 21 can be monitored again to determine if the user has actuated the release hold selection means 62 as shown in blocks 92 and 94, respectively. If the user of the cellular telephone has actuated the release hold selection means, voice communications are established with the source telephone, typically by opening the speaker and microphone of the cellular telephone, to complete the accepted telephone call as shown in block 96. If, however, the release hold selection means has not been actuated by the user of the cellular telephone, the second timer is decremented and polled to determine if the second timer has expired as illustrated in blocks 98 and 100, respectively. If the second timer has expired, a message is preferably transmitted to the user of the source telephone as shown in block 102 to inform the calling party that the user of the cellular telephone is unavailable. If the second timer has not expired, the system and method of the present invention continues to monitor the cellular telephone to determine if the release hold selection means has been actuated by the user until either the second timer expires or the release hold selection means is activated.

If the hold selection means 50 is not actuated in response to the alert of the cellular telephone 21, the system and method of the present invention continues to monitor the cellular telephone to determine if the user has actuated the answer selection means 48 as shown in block 104. If the user has actuated the answer selection means, voice communications are established with the source telephone, typically by opening the speaker 40 and the microphone 42 of the cellular telephone, as shown in block 106. If the user of the cellular telephone has not actuated the answer selection means, the first timer 58 is decremented and is polled to determine if it has expired, as illustrated in blocks 108 and 110, respectively. If the first timer has expired, a message is preferably transmitted to the source telephone as shown in block 112 to inform the calling party that the user of the cellular telephone is unavailable. If the first timer has not expired, the system and method of the present invention continues to monitor the cellular telephone to determine if the user has actuated the hold selection means until either the first timer expires or the hold selection means is activated.

Thus, according to the present invention, the user of a cellular telephone 21 can more selectively establish voice communications with a source telephone requesting communications with the cellular telephone. For example, the user of the cellular telephone can immediately establish voice communications with the calling party by actuating the answer selection means 48. Alternatively, the user of the cellular telephone can accept the telephone call by activating the hold selection means 50. Even though the telephone call is accepted, the establishment of voice communications with the source telephone is delayed until the user has, for example, completed their prior activities. Once the user has completed their prior activities, the user can establish voice communications with the source telephone of the accepted telephone call by actuating the release hold selection means 62. Thus, a user of a cellular telephone can more conveniently and safely accept telephone calls while performing other sometimes demanding activities.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A cellular radio communications system comprising:
a cellular telephone comprising:
notification means for alerting a user of said cellular telephone that a source telephone has placed a telephone call to said cellular telephone;
hold selection means;
release hold selection means; and
answer selection means;
answering delay means, responsive to said notification means and further responsive to actuation of said hold selection means by the user of said cellular telephone, for accepting the telephone call from the source telephone without establishing voice communications between said cellular telephone and the source telephone, and for transmitting a predetermined signal to the source telephone;

answering means, responsive to actuation of said answer selection means by the user of said cellular telephone after said notification means has alerted the user, for establishing voice communications between said cellular telephone and the source telephone without delay; and releasing means, responsive to actuation of said release hold selection means by the user of said cellular telephone after acceptance of the telephone call from the source telephone by said answering delay means, for establishing voice communications between said cellular telephone and the source telephone;

wherein said answering delay means comprises timer means and wherein said answering delay means is responsive to actuation of said hold selection means only within a predetermined period of time after said notification means has alerted the user.

2. A cellular radio communications system according to claim 1 wherein said cellular telephone further comprises a speaker and a microphone and wherein said answering delay means includes means for establishing a communications link between the source telephone and said cellular telephone without opening said speaker and said microphone such that voice communications are prevented therebetween.

3. A cellular radio communications system according to claim 2 wherein said answering means comprises means for opening said speaker and said microphone such that voice communications are established between the source telephone and said cellular telephone without delay, and wherein said releasing means comprises means for opening said speaker and said microphone such that voice communications are established between the source telephone and said cellular telephone.

4. A cellular radio communications system according to claim 1, wherein said answering delay means comprises means for transmitting a predetermined message to the source telephone to announce the acceptance of the telephone call.

5. A cellular radio communications system according to claim 1 wherein said cellular telephone further comprises means for displaying a predetermined telephone number assigned to the source telephone such that the user of said cellular telephone can identify the user of the source telephone before responding to the alert of said notification means.

6. A cellular telephone comprising:
notification means for alerting a user of the cellular telephone that a source telephone has placed a telephone call to the cellular telephone;
hold selection means;
release hold selection means;
answer selection means;
answering delay means, responsive to said notification means and further responsive to actuation of said hold selection means by the user of the cellular telephone, for accepting the telephone call from the source telephone without establishing voice communications between the cellular telephone and the source telephone, and for transmitting a predetermined signal to the source telephone;

answering means, responsive to actuation of said answer selection means by the user of the cellular telephone after said notification means has alerted the user, for establishing voice communications between the cellular telephone and the source telephone without delay; and releasing means, responsive to actuation of said release hold selection means by the user of the cellular telephone after acceptance of the telephone call from the source telephone by said answering delay means, for establishing voice communications between the cellular telephone and the source telephone;

wherein said answering delay means comprises timer means and wherein said answering delay means is responsive to actuation of said hold selection means only within a predetermined period of time after said notification means has alerted the user.

7. A cellular telephone according to claim 6 further comprising a speaker and a microphone and wherein said answering delay means includes means for establishing a communications link between the source telephone and the cellular telephone without opening said speaker and said microphone such that voice communications are prevented therebetween.

8. A cellular telephone according to claim 7 wherein said answering means comprises means for opening said speaker and said microphone such that voice communications are established between the source telephone and the cellular telephone without delay, and wherein said releasing means comprises means for opening said speaker and said microphone such that voice communications are established between the source telephone and the cellular telephone.

9. A cellular telephone according to claim 6 wherein said answering delay means comprises means for transmitting a predetermined message to the source telephone to announce the acceptance of the telephone call.

10. A cellular telephone according to claim 6 further comprising means for displaying a predetermined telephone number assigned to the source telephone such that the user of the cellular telephone can identify the user of the source telephone before responding to the alert of said notification means.

11. A feature node for providing predetermined functions to a plurality of cellular telephones of a cellular radio communications system, at least one cellular telephone comprising hold selection means, release hold selection means and answer selection means, the feature node comprising:

notification means for alerting a user of a cellular telephone that a source telephone has placed a telephone call to the cellular telephone;

answering delay means, responsive to said notification means and further responsive to actuation of the hold selection means of the cellular telephone by the user of the cellular telephone, for accepting the telephone call from the source telephone without establishing voice communications between the cellular telephone and the source telephone, and for transmitting a predetermined signal to the source telephone;

answering means, responsive to actuation of the answer selection means by the user of the cellular telephone after said notification means has alerted the user, for establishing voice communications between the cellular telephone and the source telephone without delay;

releasing means, responsive to actuation of the release hold selection means by the user of the cellular telephone after acceptance of the telephone call from the source telephone by said answering delay means, for establishing voice communications between the cellular telephone and the source telephone; and timer means and wherein said answering delay means is responsive to actuation of said hold selection means only within a predetermined period of time after said notification means has alerted the user.

12. A feature node according to claim 11 wherein the at least one cellular telephone also includes a speaker and a microphone and wherein said answering delay means includes means for establishing a communications link between the source telephone and the cellular telephone without opening the speaker and the microphone such that voice communications are prevented therebetween.

13. A feature node according to claim 12 wherein said answering means comprises means for opening said speaker and said microphone such that voice communications are established between the source telephone and the cellular telephone without delay, and wherein said releasing means comprises means for opening said speaker and said microphone such that voice communications are established between the source telephone and the cellular telephone.

14. A feature node according to claim 11 wherein said answering delay means comprises means for transmitting a predetermined message to the source telephone to announce the acceptance of the telephone call.

15. A feature node according to claim 11 further comprising means for providing a predetermined telephone number of the source telephone to the cellular telephone such that the user of the cellular telephone can identify the user of the source telephone before responding to the alert of said notification means.

16. A method of selectively establishing voice communications between a cellular telephone and a source telephone placing a telephone call to the cellular telephone, wherein the cellular telephone comprises hold selection means, release hold selection means and answer selection means, the method comprising the steps of:

alerting a user of the cellular telephone that the source telephone has placed a telephone call to the cellular telephone;

accepting the telephone call from the source telephone upon actuation of the hold selection means by the user of the cellular telephone after said alerting step without establishing voice communications between the cellular telephone and the source telephone;

establishing voice communications between the cellular telephone and the source telephone without delay upon actuation of the answer selection means by the user of the cellular telephone after said alerting step;

establishing voice communications between the cellular telephone and the source telephone of the previously accepted telephone call upon actuation of the release hold selection means by the user of the cellular telephone after said accepting step; and determining the elapsed time since the user of the cellular telephone was initially alerted wherein the telephone call from the source telephone can be accepted only within a predetermined period of time after the user of the cellular telephone was initially alerted.

17. A method according to claim 16 wherein the cellular telephone further comprises a speaker and a microphone and wherein said accepting step comprises the step of establishing a communications link between the source telephone and the cellular telephone without opening the speaker and the microphone such that voice communications are prevented therebetween.

18. A method according to claim 17 wherein both said steps of establishing voice communications comprise the step of opening the speaker and the microphone such that voice communications are established between the source telephone and the cellular telephone to announce the acceptance of the telephone call.

19. A method according to claim 16 wherein said accepting step comprises the step of transmitting a predetermined message to the source telephone.

20. A method according to claim 16 wherein said alerting step comprises the step of displaying a predetermined telephone number assigned to the source telephone such that the user of said cellular telephone can identify the user of the source telephone before responding to the alert.

* * * * *